United States Patent [19]
Moore

[11] 3,919,777
[45] Nov. 18, 1975

[54] ANGLE TRISECTOR
[76] Inventor: William M. Moore, 1578 Scotty St., San Jose, Calif. 95122
[22] Filed: Mar. 22, 1972
[21] Appl. No.: 237,033

Related U.S. Application Data
[63] Continuation-in-part of Ser. No. 42,724, June 2, 1970, Pat. No. 3,693,261.

[52] U.S. Cl. .............................. 33/1 AP
[51] Int. Cl.² ................ G01B 3/00; B43L 9/08
[58] Field of Search .................. 33/1 R, 1 AP

[56] References Cited
UNITED STATES PATENTS
992,371   5/1911   Mather ........................ 33/1 AP
1,008,814  11/1911  Goodfellow ................... 33/1 AP
1,294,935  2/1919   Milliken ....................... 33/1 AP Primary Examiner—William D. Martin, Jr.
Attorney, Agent, or Firm—Elton H. Brown, Jr.

[57] ABSTRACT

Transparent plastic T-square and other devices for performing geometrical and trigonometrical measurements with particular emphasis on trisecting angles and dividing angles into a plurality of equal segments.

1 Claim, 14 Drawing Figures

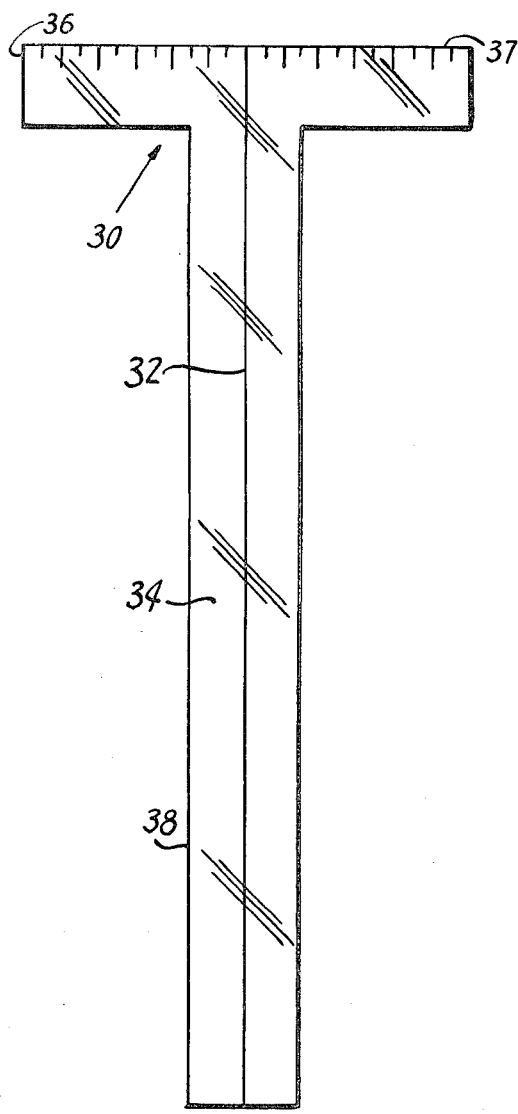
FIG. 1
FIG. 2
FIG. 4
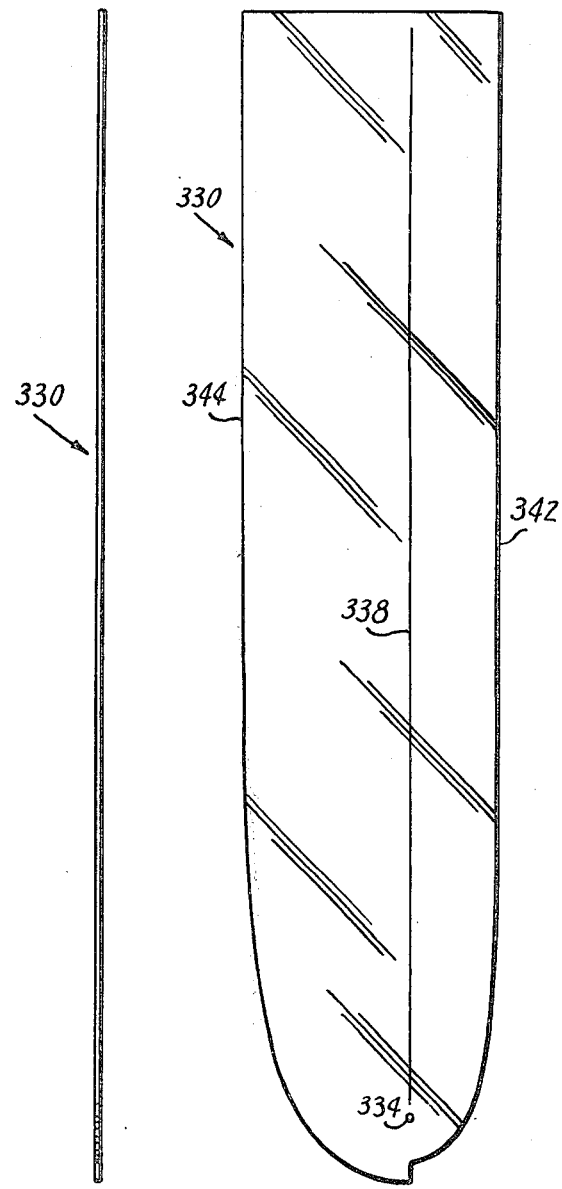
FIG. 3

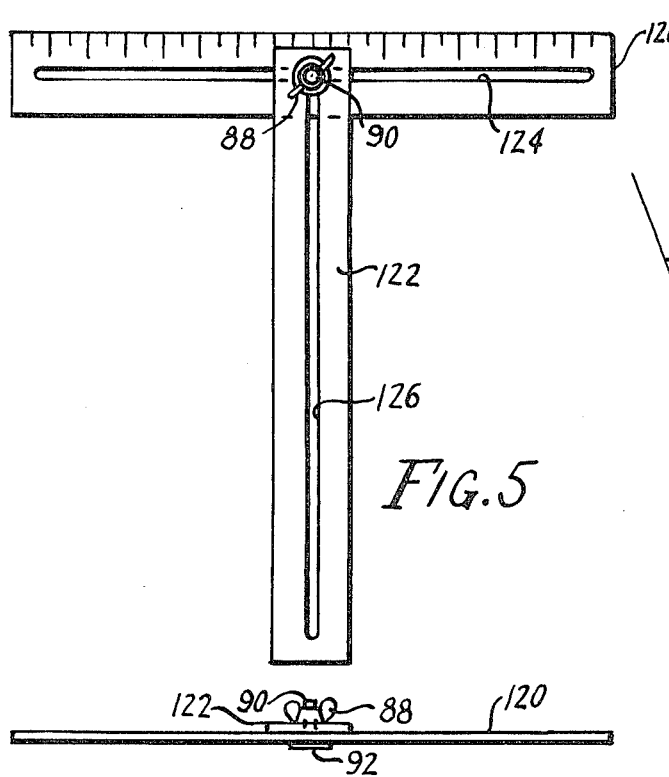
FIG.5
FIG.6
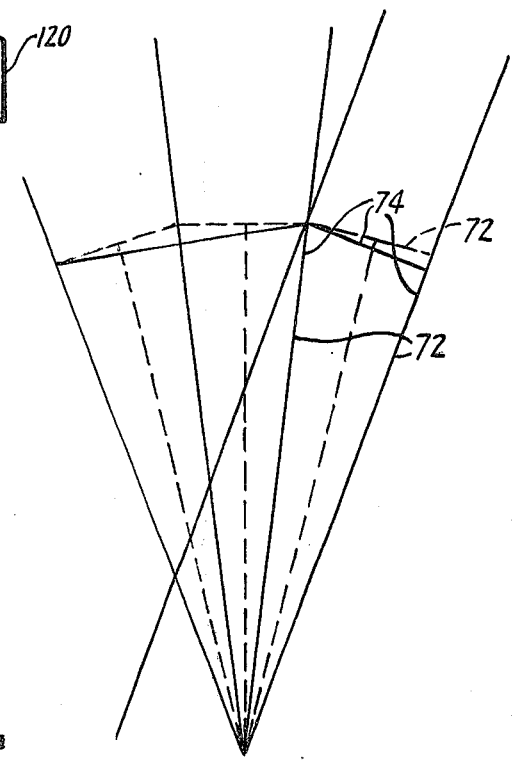
FIG.7
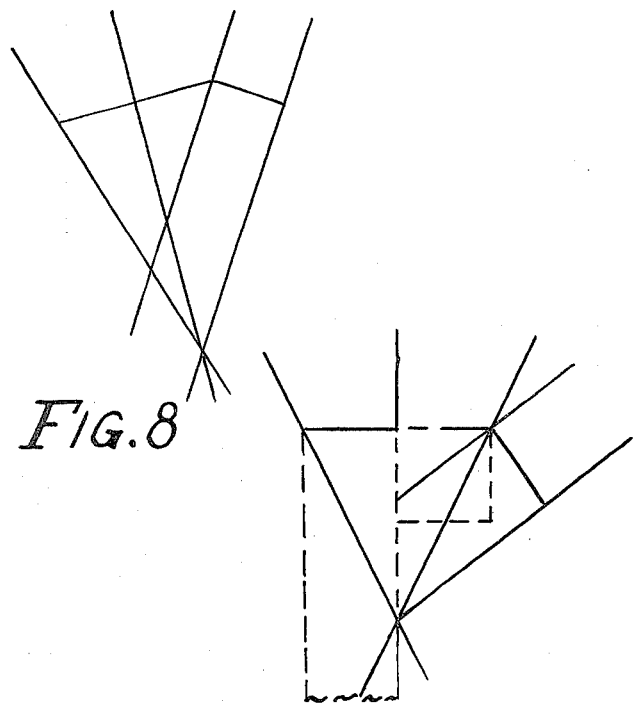
FIG.8
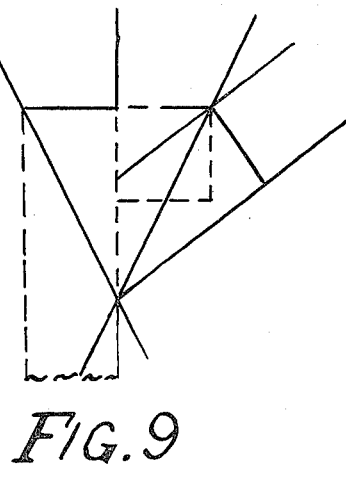
FIG.9
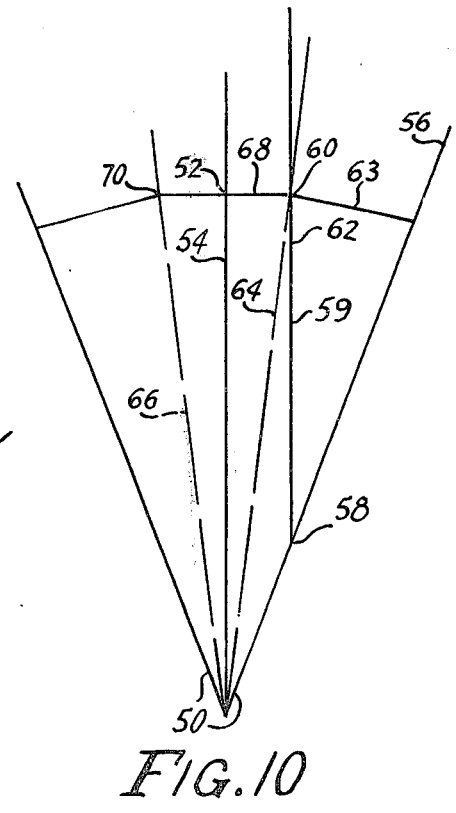
FIG.10

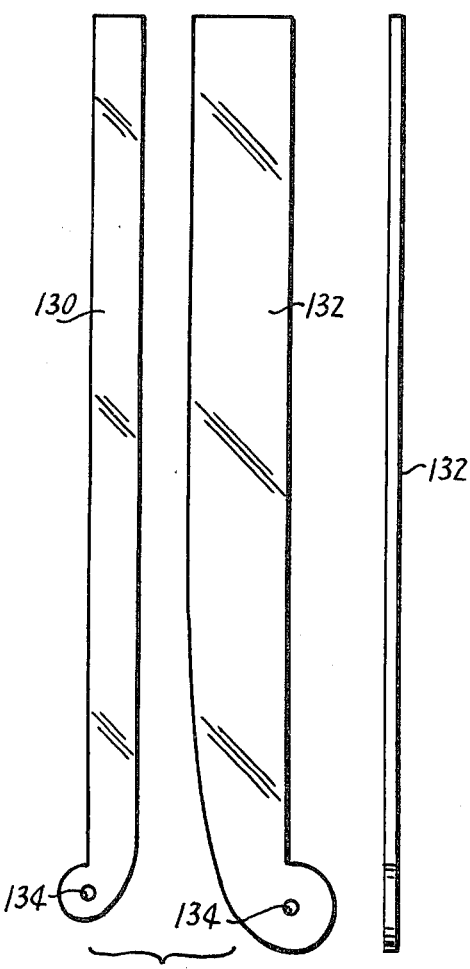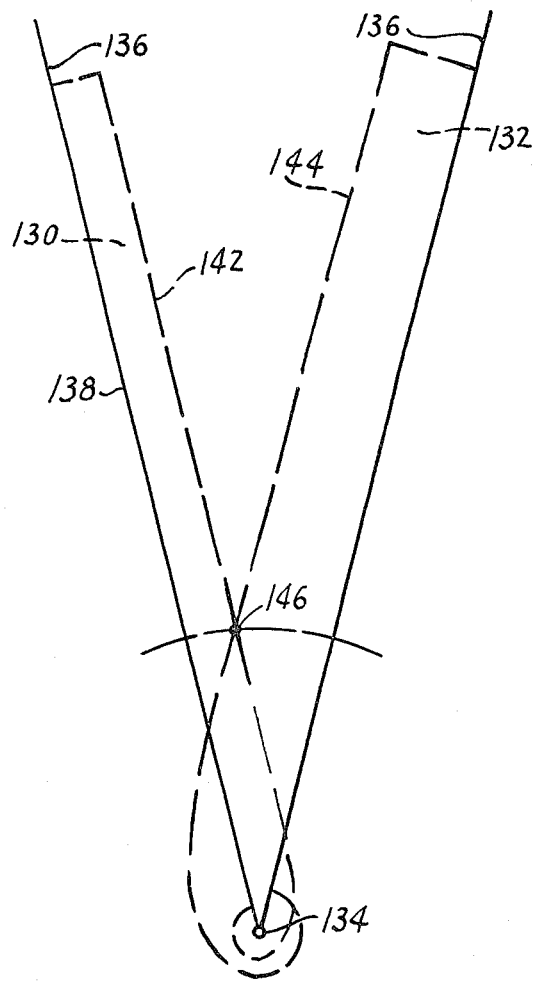
FIG.11  FIG.12  FIG.13
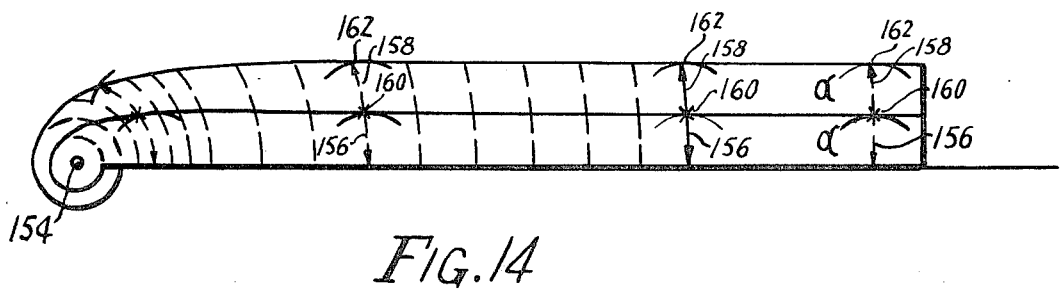
FIG.14

ANGLE TRISECTOR

This application is a continuation-in-part of my copending application Ser. No. 42,724, filed June 2, 1970 entitled "ANGLE TRISECTOR," now U.S. Pat. No. 3,693,261.

This invention relates to devices for trisecting angles and performing other types of geometrical and trigonometrical tasks.

Dividing an angle into a plurality of parts has heretofore been solved either by completely manual or a combination of manual and instrument steps involving several different tedious steps and inaccurate results, the instruments being namely either the common compass or the conventional protractor. This invention facilitates the procedure by which an angle is divided up by means of a completely novel method of achieving equal angular segments and by completely novel instruments for rapidly and accurately accomplishing the desired results.

Accordingly, a primary object of this invention is a new use for conventional tools in dividing an angle into a plurality of segments.

Another object of this invention is to provide a device which divides an angle into the desired number of equal segments without the necessity of aid from present conventional tools.

A further object of this invention is to provide devices which allow division of angles in a more accurate and rapid manner.

The above and other objects of the invention will become apparent to those skilled in the art after consideration of the following detailed description of the preferred embodiments of this invention taken together with the accompanying drawings in which:

FIG. 1 is a top plan view of one form of the invention;

FIG. 2 is a side elevation of the structure illustrated in FIG. 1;

FIG. 3 is a top plan view of another form of the invention;

FIG. 4 is a side elevation of the structure illustrated in FIG. 3;

FIG. 5 is a top plan view of still another form of this invention;

FIG. 6 is a side elevation of the structure illustrated in FIG. 5;

FIGS. 7–9 are diagrammatic views illustrating the trisecting of an angle pursuant the prior art;

FIG. 10 is a diagrammatic view illustrating the trisecting of an angle pursuant the present invention;

FIGS. 11 and 13 are top plan views of a further form of this invention;

FIG. 12 is a side elevation of the structure illustrated in FIG. 11; and

FIG. 14 is a diagrammatic view showing the construction of the device shown in FIGS. 11–13.

Referring in detail to the drawings, a transparent plastic T-square 30 having a center line 32 along its length 34 and graduated divisions along the short horizontal transverse portion 36 is disclosed in FIGS. 1 and 2. T-square 30 facilitates the trisecting of any angle such as angle 50 in FIG. 10.

Angle 50 of FIG. 10 is first divided in half by using equal graduations of portion 36 and center line 32 to draw a point 52, a line 54 being drawn through the vertex of angle 50 and point 52. The edge 38 of T-square 30 is then placed on line 54 and the intersection of horizontal portions 36 with the right leg 56 of angle 50 at any point along right leg 56 is marked off as a reference point 58. The distance between point 58 and line 54 is measured by means of the graduations on horizontal portion 36. An equal distance is measured off at any other point 59 and a line 62 is drawn through points 58 and 59 parallel to line 54. Next, edge 38 of T-square 30 is placed at the vertex of angle 50 and is positioned so that the distance along edge 37 of portion 36 between edge 38 and line 62 is equal to the distance between edge 38 and line 56 and is equal to the distance between line 62 and line 54. A line 63 is then drawn along edge 37 meeting line 62 at point 60. A line 64 is drawn through the vertex of angle 50 and point 60, the angle between line 64 and line 56 being one-third of angle 50. A line 66 completing the trisection of angle 50 is determined by merely using the T-square to draw a line 68 perpendicular to line 54 and intersecting point 60, a point 70 for drawing line 66 being determined by drawing point 70 the same distance from line 54 as that of point 60.

The prior art right angle triangle method of trisecting an angle is shown in FIGS. 8 and 9 in order to particularly point out and distinctly illustrate the differences between the prior art method and that of this invention. The major difference between the methods are illustrated in FIG. 7 where the diagram of FIGS. 8 and 9 is superposed over the diagram of FIG. 10. The method of this invention is based upon isosceles triangles 72 whereas the prior art method is based upon right triangles 74.

The angle trisector of FIG. 5 is a variation of FIG. 1 in that it combines the features of FIG. 1 with the manual method of trisecting an angle as was described in connection with FIG. 10. The graduated blade 120 and the blade 122 transverse thereto both have longitudinal center grooves 124 and 126 respectively, blades 120 and 122 rotating about fastener 90 so that they may be used as either a T-square or a bevel square.

Shown in FIG. 11 are two plastic transparent blades 130 and 132, each blade having a hole 134 at one end thereof. Blades 130 and 132 are laid over each other and pivoted about holes 134, as shown in FIG. 13, until edges 138 and 140 of blades 130 and 132 respectively coincide with any angle such as angle 136 which is to be trisected. It should be noted that holes 134 will always be placed at the vertex of the angle in order to match the size of the blades with the angle. The intersection point 146 of edges 142 and 144 of blades 130 and 132 respectively forms one of the trisection points of the angle when a line is drawn between point 146 and the vertex of the angle. FIGS. 11–13 show the dual blade angle trisector.

Blades 130 and 132 may be constructed by a ruler and compass as illustrated in FIG. 14. Arcs are drawn out to infinity by a compass having a center point at point 154 which coincides with holes 134 of FIGS. 11 and 13. Equal segments 156 and 158 are marked off by a compass along each arc and are then connected by a line drawn through each point 160 and a line drawn through each point 162, these lines representing edges 142 and 144 respectively of blades 130 and 132. It should be noted that blades 130 and 132 may be constructed to divide an angle into any number of parts by merely varying the relationship of the segments 156 and 158 to each other.

In FIGS. 3 and 4 a modified form of the instrument is illustrated generally at 330. The instrument 330 is a single piece structure shaped generally in the manner of the blades 130, 132. The instrument 330 is formed of flat transparent material and has a bore 334 formed in one end thereof. A straight line 338 is marked on the instrument and is aligned with the bore 334. The edge 342 of the instrument 330 is developed in the exact manner described for developing the edge 142, and the edge 344 is similarly developed as described for the edge 344.

In the use of the instrument 330 in trisecting an angle, the instrument is laid on the angle to be trisected with the bore 334 centered on the vertex of the angle and the line 338 coinciding with one side of the angle. In this position the edge 342 lies between the sides of the angle and a line is drawn therealong. The instrument 330 is then pivoted over until the line 338 coincides with the opposite side of the angle and a line is drawn along edge 344 intersecting the line drawn along edge 342. The point of intersection of the lines marks a point that trisects the angle.

While the preferred embodiments of this invention have been illustrated and described, it will be understood by those skilled in the art that modifications and changes may be resorted to without departing from the spirit and scope of the invention.

I claim:

1. An angle divider comprising a single transparent blade having a bore at one end, said blade having a straight line marked thereon in aligned relation to said bore, a pair of curved edges on said blade on opposite sides of said line, the curved edges of said blade being formed by equal segments of arcs extending from said line and having their centers as said bore, the relationship to each other of the curved edges of said blade determining the angular fraction of an angle to be divided, the intersection of lines drawn along said curved edges determining the angular fraction when said line coincides with the legs of the angle to be divided.

* * * * *